(12) United States Patent
Finch et al.

(10) Patent No.: US 8,947,245 B2
(45) Date of Patent: Feb. 3, 2015

(54) APPARATUS AND METHOD FOR TRANSMITTING OPERATING CYCLE ALERTS

(75) Inventors: Michael Finch, Louisville, KY (US); Peter Pepe, Louisville, KY (US); Natarajan Venkatakrishnan, Louisville, KY (US); David McCalpin, Louisville, KY (US)

(73) Assignee: General Electric Company, Schenectady, NY (US)

( * ) Notice: Subject to any disclaimer, the term of this patent is extended or adjusted under 35 U.S.C. 154(b) by 740 days.

(21) Appl. No.: 13/221,217

(22) Filed: Aug. 30, 2011

(65) Prior Publication Data
US 2013/0049970 A1 Feb. 28, 2013

(51) Int. Cl.
*G08B 21/00* (2006.01)
*H02J 3/14* (2006.01)

(52) U.S. Cl.
CPC ............. *H02J 3/14* (2013.01); *H02J 2003/143* (2013.01); *Y02B 70/3225* (2013.01); *Y02B 70/3266* (2013.01); *Y04S 20/222* (2013.01); *Y04S 20/242* (2013.01)
USPC ................... 340/635; 340/309.16; 340/309.7

(58) Field of Classification Search
CPC .... G08B 21/023; G08B 21/18; G08B 21/182; G08B 25/009; G08B 25/08; G08B 7/06; H04M 1/72533; G04G 13/02; G04F 1/005; A47L 2401/20; A47L 2401/22; D06F 2058/2883; D06F 2058/2896
USPC ........................ 340/635, 309.16, 309.2–309.9
See application file for complete search history.

(56) References Cited

U.S. PATENT DOCUMENTS

| | | | |
|---|---|---|---|
| 4,864,498 A | 9/1989 | Pasquini et al. | |
| 4,916,439 A * | 4/1990 | Estes et al. | 340/679 |
| 5,281,783 A * | 1/1994 | An | 219/689 |
| 5,925,279 A * | 7/1999 | Baek | 219/720 |
| 6,323,777 B1 * | 11/2001 | Durston et al. | 340/679 |
| 6,453,687 B2 | 9/2002 | Sharood et al. | |
| 6,789,463 B2 | 9/2004 | Lile | |
| 2003/0085795 A1* | 5/2003 | An | 340/3.1 |
| 2003/0233201 A1* | 12/2003 | Horst et al. | 702/62 |
| 2006/0240800 A1 | 10/2006 | Bannan | |
| 2008/0297363 A1* | 12/2008 | Fukushige | 340/635 |
| 2009/0251310 A1* | 10/2009 | Bloebaum | 340/539.11 |
| 2010/0094470 A1 | 4/2010 | Besore et al. | |
| 2010/0179708 A1 | 7/2010 | Watson et al. | |
| 2011/0148199 A1 | 6/2011 | Besore et al. | |
| 2011/0153109 A1 | 6/2011 | Drake et al. | |

* cited by examiner

*Primary Examiner* — Mohammad Ghayour
*Assistant Examiner* — Nay Tun
(74) *Attorney, Agent, or Firm* — GE Global Patent Operation; Marc A. Vivenzio

(57) ABSTRACT

An apparatus includes a memory device configured to store computer-readable instructions and data representative of at least an alert trigger time that represents a time before an end of an operating cycle of an appliance communicatively coupled to a home energy manager. The apparatus further includes a processor coupled to the memory device and configured to execute the computer-readable instructions, which when executed by the processor, cause the processor to determine a remaining cycle time for the operating cycle of the appliance, compare the remaining cycle time to the alert trigger time stored in the memory device, generate an alert when the remaining cycle time is equal to the alert trigger time, and transmit the generated alert to at least one remote device.

17 Claims, 4 Drawing Sheets

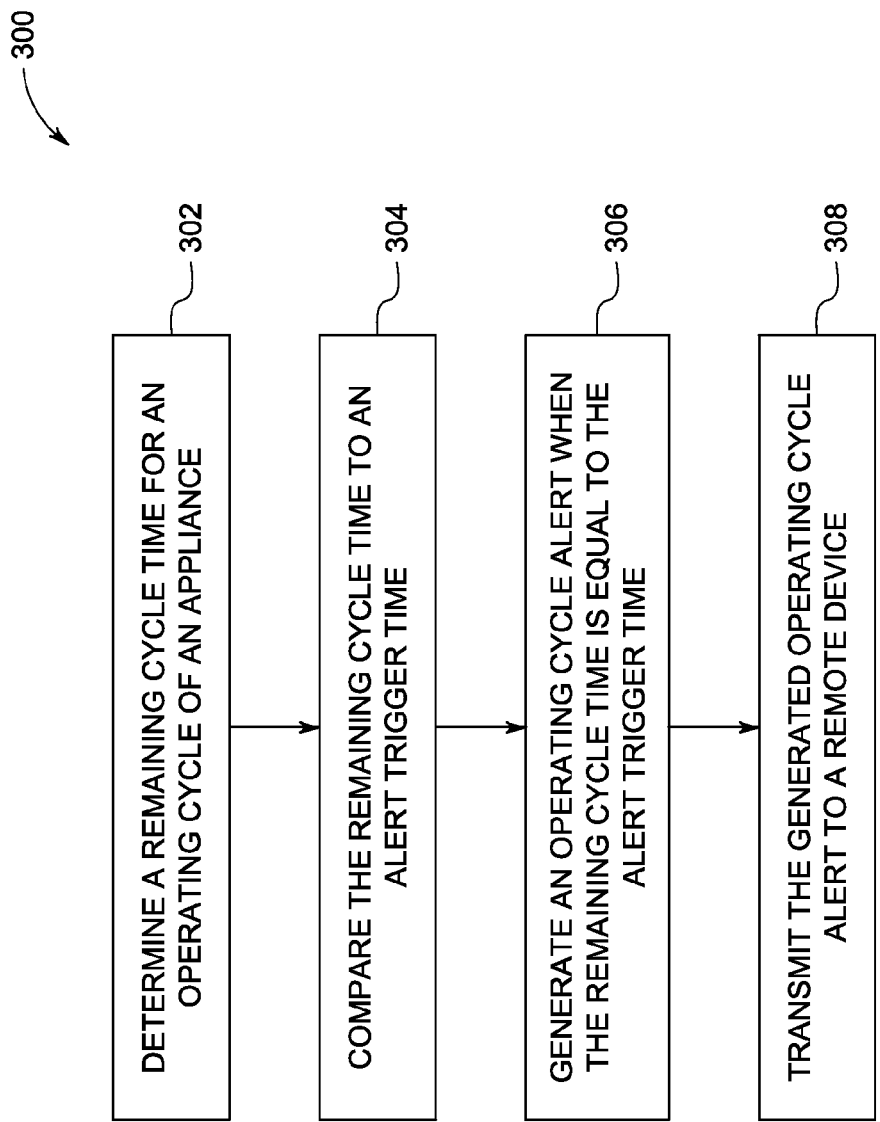

APPARATUS AND METHOD FOR TRANSMITTING OPERATING CYCLE ALERTS

BACKGROUND OF THE INVENTION

The embodiments described herein relate generally to a home energy manager, and more particularly, to transmitting operating cycle alerts for appliances coupled to the home energy manager.

Utility companies commonly charge a flat rate for energy, but high energy usage during certain parts of the day, utility companies have to buy more energy to supply consumers during peak demand. Consequently, utility companies are beginning to charge higher rates during peak demand. Accordingly, at least some known systems utilize a home energy manager coupled to a plurality of devices and/or appliances. The home energy manager monitors the amount of energy supplied to the devices and/or appliances, and may switch off the actual energy supplied to the devices and/or appliances to reduce energy usage particularly during peak demand periods.

One or more of the appliances connected to at least some known home energy managers perform an operating cycle. For example, a dishwasher washes dishes for a predetermined washing cycle, and a dryer dries clothing for a predetermined drying cycle. Further, at least some known appliances generate an end-of-cycle alert when an operating cycle is complete. For example, an appliance may emit a sound or display an icon when an operating cycle is finished. However, at least some known systems do not provide an alert to a user before the operating cycle of the appliance is finished. Accordingly, in at least some known systems, users may only become aware of the end-of-cycle time when the end-of-cycle actually occurs, not beforehand.

BRIEF DESCRIPTION OF THE INVENTION

In one aspect, an apparatus is provided. The apparatus includes a non-transitory memory device configured to store computer-readable instructions and data representative of at least an alert trigger time that represents a time remaining before an end of an operating cycle of an appliance communicatively coupled to a home energy manager. The apparatus further includes a processor coupled to the memory device and configured to execute the computer-readable instructions, which when executed by the processor, cause the processor to determine a remaining cycle time for the operating cycle of the appliance, compare the remaining cycle time to the alert trigger time stored in the memory device, generate an alert when the remaining cycle time is equal to the alert trigger time, and transmit the generated alert to at least one remote device.

In another aspect, one or more non-transitory computer-readable storage media having computer-readable instructions embodied thereon are provided. When executed by a processor, the computer-readable instructions cause the processor to determine a remaining cycle time for an operating cycle of an appliance communicatively coupled to a home energy manager, compare the remaining cycle time to an alert trigger time that represents a time before the end of the operating cycle, generate an alert when the remaining cycle time is equal to the alert trigger time, and transmit the generated alert to at least one remote device.

In yet another aspect, a method for transmitting an operating cycle alert for an appliance communicatively coupled to a home energy manager is provided. The method includes determining, using a processor, a remaining cycle time for an operating cycle of the appliance, comparing, using the processor, the remaining cycle time to an alert trigger time that represents a time before the end of the operating cycle, generating, using the processor, the operating cycle alert when the remaining cycle time is equal to the alert trigger time, and transmitting the generated operating cycle alert to at least one remote device.

BRIEF DESCRIPTION OF THE DRAWINGS

FIGS. 1-4 show exemplary embodiments of the apparatus and method described herein.

FIG. 1 is a block diagram of an exemplary energy management system.

FIG. 2 is a block diagram of an alternative energy management system.

FIG. 3 is a schematic diagram of an exemplary home energy manager that may be used with the energy management systems shown in FIGS. 1 and 2.

FIG. 4 is a flowchart of an exemplary method for transmitting an operating cycle alert that may be used with the energy management systems shown in FIGS. 1 and 2.

DETAILED DESCRIPTION OF THE INVENTION

The systems and methods described herein transmit an operating cycle alert for an appliance connected to a home energy manager. The operating cycle alert notifies a user of the remaining time in an operating cycle of the appliance. More specifically, the home energy manager determines a remaining cycle time for an appliance and compares the remaining cycle time with an alert trigger time. When the remaining cycle time is equal to the alert trigger time, the home energy manager generates and transmits the operating cycle alert. Upon receiving the operating cycle alert, a user is notified of the remaining time for the operating cycle, and can plan accordingly.

Technical effects of the methods and systems described herein include at least one of: (a) determining, using a processor, a remaining cycle time for an operating cycle of an appliance; (b) comparing, using the processor, the remaining cycle time to an alert trigger time that represents a time before the end of the operating cycle; (c) generating, using the processor, an operating cycle alert when the remaining cycle time is equal to the alert trigger time; and (d) transmitting the generated operating cycle alert to at least one remote device.

The embodiments described herein facilitate notifying a user of the remaining time in an operating cycle of an appliance. As users often need to take one or more actions when an operating cycle ends, it is advantageous for users to be aware of the end of the operating cycle before the operating cycle actually ends. For example, users may not be located proximate to the appliance during the operating cycle, and may need time to reach the appliance to take an appropriate action when the cycle ends. Thus, using the embodiments described herein, users can better anticipate the end of an operating cycle, and adjust their schedule accordingly.

Figure 1:
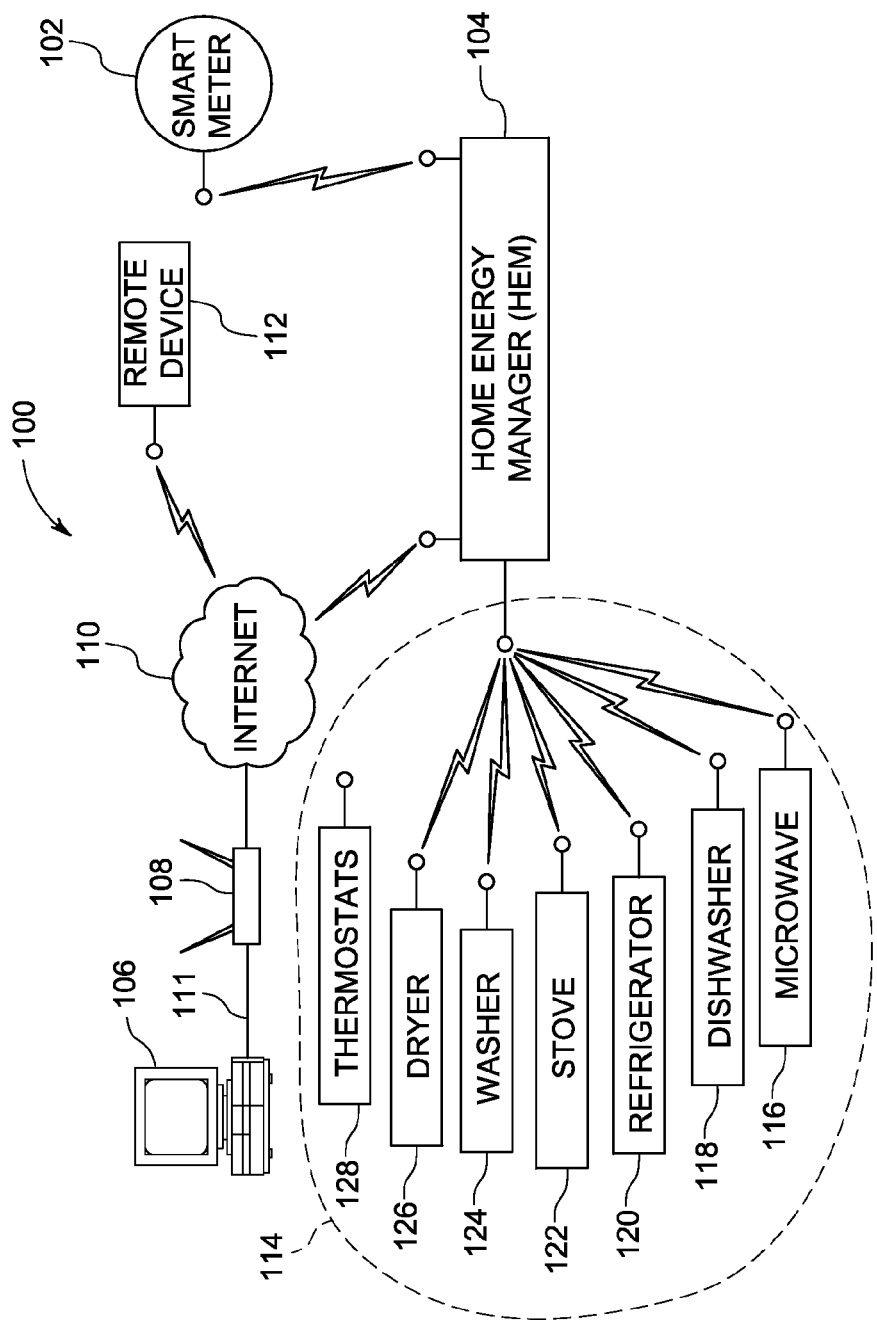

FIG. 1 is a block diagram of an exemplary energy management system 100. Energy management system 100 includes a smart meter 102 communicatively coupled to a home energy manager (HEM) 104. In the exemplary embodiment, HEM 104 monitors and controls operation of a plurality of devices in a home, as described in detail below. Alternatively, HEM 104 monitors and controls operation of devices in any location, for example, a residence, an office building, and/or an industrial facility.

In the exemplary embodiment, smart meter 102 is programmed to obtain energy consumption measurements from HEM 104 at a start of a billing period and at an end of the billing period and to store energy consumption measurements. For example, the billing period may be thirty days, a calendar month, and/or any other time period that enables energy management system 100 to function as described herein. Moreover, in the exemplary embodiment, smart meter 102 is enabled to measure and store energy consumption measurements periodically, such as every hour, every ten minutes, and/or at any other suitable frequency. Smart meter 102 may also measure energy consumption upon a request (i.e., "on demand").

In the exemplary embodiment, a computing device 106, such as a desktop and/or laptop, is communicatively coupled to a network 110, such as the Internet, through a communications device 108, such as a modem and/or router. In the exemplary embodiment, computing device 106 is coupled to communications device 108 by a wired IEEE 802.3 (Ethernet) connection 111. Alternatively, computing device 106 may be coupled to communications device 108 using any communications medium and/or network that enables energy management system to function 100 as described herein. For example, computing device 106 may be coupled to communications device 108 using an IEEE 802.11 (Wi-Fi) connection. Further, in some embodiments, computing device 106 is coupled directly to HEM 104 via a wired connection and/or a wireless connection.

Energy management system 100 may include a remote device 112 that communicatively couples to HEM 104 using a wireless connection. For example, in one embodiment, remote device 112 communicates with HEM 104 over a Wi-Fi connection using network 110, such as the Internet. Alternatively, remote device 112 communicates with HEM 104 using any communication medium and/or network that enables energy management system 100 to function as described herein. Exemplary networks include a mesh network, a power line communications (PLC) network, a cellular network, a general packet radio service (GPRS) network, an Enhanced Data Rates for Global Evolution (EDGE) network, a WiMAX network, a WiFi network, a P1901 network, a ZIGBEE 0 network (e.g., ZigBee Smart Energy 1.0, ZigBee Smart Energy 2.0), and/or a HOMEPLUG 8 network. ZIGBEE is a registered trademark of ZigBee Alliance, Inc., of San Ramon, Calif. HOMEPLUG 0 is a registered trademark of HomePlug Powerline Alliance, Inc., of Portland, Oreg. In the exemplary embodiment, remote device 112 is a smart hand-held device, such as, but not limited to, a web/internet enabled smart phone, a pager, and/or a remote control device for HEM 104. Remote device 112 communicates with HEM 104 to configure and/or receive operating cycle alerts, as described in more detail below.

HEM 104 is communicatively coupled to one or more appliances 114. In the exemplary embodiment, the one or more appliances 114 may include any or all of the following: a microwave oven 116, a dishwasher 118, a refrigerator 120, a stove 122, a washer 124, a dryer 126, and a thermostat 128. Alternatively, HEM 104 is communicatively coupled to any appliance 114 that enables energy management system 100 to function as described herein. Remote device 112 communicates with HEM 104 to display data related to one or more appliances 114, configure operating cycle alerts related to one or more appliances 114, and/or receive operating cycle alerts related to one or more appliances 114, as described in detail below.

Figure 2:
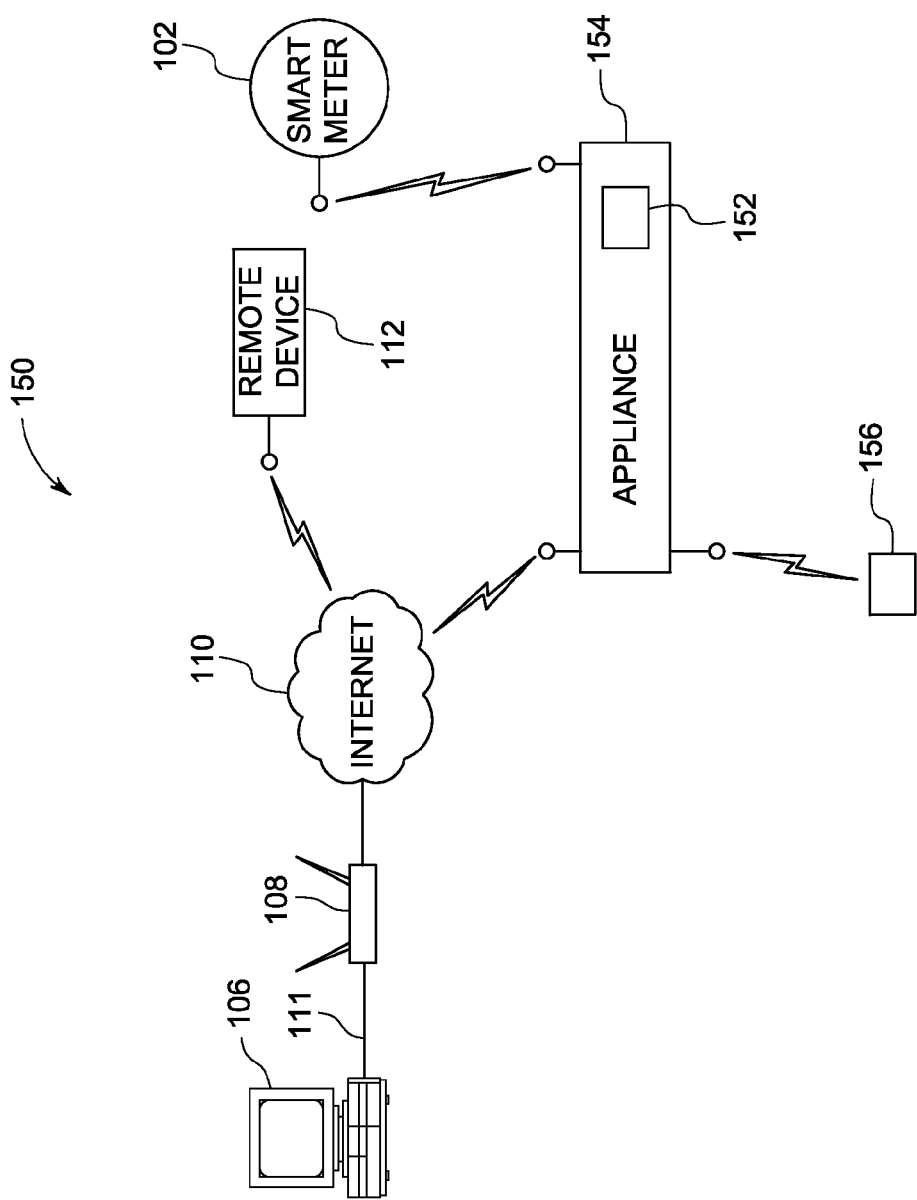

FIG. 2 is a block diagram of an alternative energy management system 150. Unless otherwise specified, energy management system 150 is substantially similar to energy management system 100 (shown in FIG. 1), and similar components are labeled in FIG. 2 with the same reference numerals used in FIG. 1. While in system 100, HEM 104 is a separate device from appliances 114, in system 150, a HEM 152 is embedded and/or integrated in an appliance 154.

Similar to HEM 104 in system 100, appliance 154 and/or HEM 152 communicates with smart meter 102, remote device 112, and/or computing device 106. Appliance 154 may include any or all of the following: a microwave oven 116, a dishwasher 118, a refrigerator 120, a stove 122, a washer 124, a dryer 126, and a thermostat 128 (all shown in FIG. 1). Further, in some embodiments, appliance 154 and/or HEM 152 may communicate with one or more additional appliances 156. As HEM 152 is embedded and/or integrated into appliance 154, the number of separate components in system 150 is reduced as compared to system 100. Further, as HEM 152 is part of appliance 154, HEM 152 can process and/or analyze data from appliance 154 without transmitting the data between two separate components.

Figure 3:
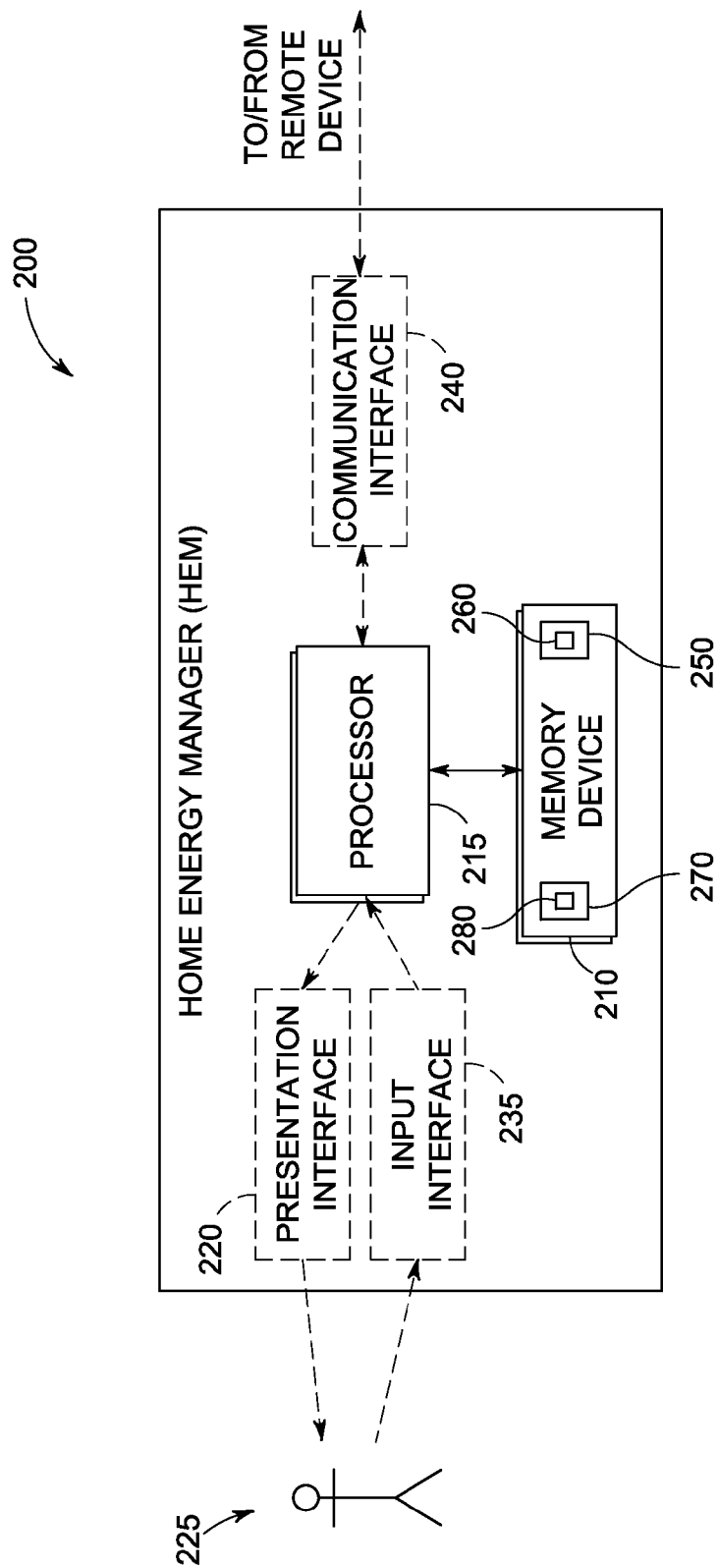

FIG. 3 is a block diagram of an exemplary HEM 200, such as HEM 104 and/or HEM 152 (shown in FIGS. 1 and 2). HEM 200 includes a memory device 210 and a processor 215 that is coupled to memory device 210 for executing computer-readable instructions. In some embodiments, the computer-readable instructions are stored in memory device 210. The computer-readable instructions represent one or more operations described herein. HEM 200 performs the one or more operations described herein when the processor 215 retrieves, loads, and executes the computer-readable instructions. For example, processor 215 may be programmed by encoding an operation as one or more computer-readable instructions and by providing the computer-readable instructions in memory device 210. Processor 215 may include one or more physical and/or virtual processing units (e.g., in a multi-core configuration).

In the exemplary embodiment, memory device 210 is one or more devices that enable information such as computer-readable instructions and/or other data to be stored and retrieved. Memory device 210 may include one or more computer readable media, such as, without limitation, dynamic random access memory (DRAM), static random access memory (SRAM), a solid state disk, and/or a hard disk. Memory device 210 may be configured to store, without limitation, application source code, application object code, source code portions of interest, object code portions of interest, configuration data, execution events and/or any other type of data. The memory device 210 may be a non-transitory computer-readable storage media having computer-readable instructions and/or data embodied thereon. When executed by a processor, the computer-readable instructions cause the processor to perform one or more functions and/or methods.

In some embodiments, HEM 200 includes a presentation interface 220 that is coupled to processor 215. Presentation interface 220 presents information, such as application source code and/or execution events, to a user 225. For example, presentation interface 220 may include a display adapter (not shown) that may be coupled to a display device, such as a cathode ray tube (CRT), a liquid crystal display (LCD), an organic LED (OLED) display, and/or an "electronic ink" display. In some embodiments, presentation interface 220 includes one or more display devices.

In some embodiments, HEM 200 includes an input interface, such as a user input interface 235 and/or a communication interface 240. In the exemplary embodiment, user input interface 235 is coupled to processor 215 and receives input from user 225. User input interface 235 may include, for example, a keyboard, a pointing device, a mouse, a stylus, a touch sensitive panel (e.g., a touch pad or a touch screen), a gyroscope, an accelerometer, a position detector, and/or an audio user input interface. A single component, such as a touch screen, may function as both a display device of presentation interface 220 and user input interface 235.

In the exemplary embodiment, communication interface 240 is coupled to processor 215. Moreover, communication interface 240 is configured to communicate with one or more devices, such as smart meter 102, computing device 106, remote device 112, and/or appliances 114, 154, and/or 156 (shown in FIGS. 1 and 2). For example, communication interface 240 may include, without limitation, a wired network adapter, a wireless network adapter, and/or a mobile telecommunications adapter. Communication interface 240 may also transmit data to one or more devices. In the exemplary embodiment, communication interface 240 facilitates communications between appliances 114, 154, and/or 156, HEM 200, and remote device 112 to display data related to one or more appliances 114, 154, and/or 156, configure operating cycle alerts related to one or more appliances 114, 154, and/or 156, and/or receive operating cycle alerts related to one or more appliances 114, 154, and/or 156, as described in detail herein.

Using communication interface 240, HEM 200 is capable of operating over multiple communication networks which use different formats, protocols, and bandwidths. This allows HEM 200 to acquire and manipulate (e.g., reformat) data of one communication network (e.g., that which monitors/controls appliances 114, 154, and/or 156) and to supply that manipulated data to another communication network (e.g., to computing device 106 and/or remote device 112), even though these networks may not be compatible. The manipulation and/or reformatting may include storing the data in memory device 210, whereby it is accessible by one or more of appliances 114, 154, and/or 156, computing device 106, and remote device 112. In some embodiments, HEM 200 translates data from a protocol understandable by one of appliances 114, 154, and/or 156, computing device 106, and remote device 112 into a protocol understandable by another of appliances 114, 154, and/or 156, computing device 106, and remote device 112.

In the exemplary embodiment, appliances 114, 154, and/or 156 operate for a predetermined operating cycle. For example, in operation, microwave oven 116 and stove 122 heat food for a predetermined amount of time, dishwasher 118 washes dishes and/or utensils for a predetermined amount of time, and dryer 126 dries clothes for a predetermined amount of time (all shown in FIG. 1). Accordingly, an operating cycle may include a cooking cycle, a washing cycle, a drying cycle, and/or any other set time period of operation associated with appliances 114, 154, and/or 156 that enables HEM 200 to function as described herein. Typically in such appliances, the predetermined amount of time for the selected cycle is determined by the appliance controller as a function of user inputs provided at the time of the cycle selection and may be influenced by other system parameters as well.

For various reasons, it is advantageous for users, such as user 225, to be aware of the time when a cycle for one or more of appliances 114, 154, and/or 156 will end. For example, if user 225 knows when microwave oven 116 or stove 122 will be finished heating food, user 225 can anticipate a meal time accordingly. Moreover, when appliances 114, 154, and/or 156 reach the end of an operating cycle, users 225 often need to take one or more actions. For example, users 225 may need to remove food from microwave oven 116 or stove 122 when it is finished cooking, to avoid burning and/or overcooking the food. Further, when a washing cycle of washer 124 is complete, the washed clothes may need to be moved to dryer 126, and when a drying cycle of dryer 126 is complete, the dried clothes may need to be sorted and/or folded by user 225.

Moreover, it is often advantageous for user 225 to be aware of the end of the operating cycle of one or more appliances 114, 154, and/or 156 before the cycle actually ends. For example, user 225 may not be in close proximity to appliance 114, 154, and/or 156 while appliance 114, 154, and/or 156 is performing the operating cycle, and user 225 may need time to reach appliance 114, 154, and/or 156 to take appropriate action when the cycle ends. Accordingly, HEM 200 generates and transmits an operating cycle alert in advance of the end of an operating cycle of one or more of appliances 114, 154, and/or 156.

With reference to FIGS. 1, 2 and 3, in operation, HEM 200 communicates with appliances 114, 154, and/or 156 to determine a remaining cycle time for one or more appliances 114, 154, and/or 156. In the exemplary embodiment, processor 215 determines the remaining cycle time based on data received from appliances 114, 154, and/or 156. Further, in the exemplary embodiment, memory device 210 stores one or more advance alert triggers 250 that include one or more appliances 114, 154, and/or 156 for which the remaining cycle time is to be determined, an alert trigger time 260, and the device to which the operating cycle alert should be transmitted. In the exemplary embodiment, alert trigger time 260 represents a time before the end of an operating cycle of appliance 114, 154, and/or 156. Alternatively, alert trigger time 260 may represent any time that enables energy management system 100 to function as described herein.

For example, memory device 210 may store an advance alert trigger 250 that instructs processor to generate and transmit an alert to remote device 112 when five minutes remain on a drying cycle of dryer 126. In the exemplary embodiment, the alert is transmitted to at least one of computing device 106 and remote device 112. Alternatively, the alert may be displayed on presentation interface 220 of HEM 200 and/or transmitted to be displayed on a display of one of appliances 114.

To determine whether an operating cycle alert needs to be generated, processor 215 compares the remaining cycle times for appliances 114, 154, and/or 156 with advance alert triggers 250. Specifically, in the exemplary embodiment, processor 215 compares the remaining cycle times with alert trigger time 260. When the remaining cycle time for the appliance 114, 154, and/or 156 specified in advance alert trigger 250 is equal to alert trigger time 260 specified in advance alert trigger 250, processor 215 generates an appropriate operating cycle alert and transmits the alert to the device specified in advance alert trigger 250.

User 225 can set advance alert triggers 250 using user input interface 235, computing device 106, and/or remote device 112. In some embodiments, to set advance alert triggers 250, user 225 selects an advance alert trigger 250 from a list 270 of preset advance alert triggers 280 stored in memory device 210. Preset advance alert triggers 280 include a predetermined appliance 114, 154, and/or 156 for which the remaining cycle time is to be determined, a predetermined alert trigger time 260, and a predetermined device to which the operating cycle alert should be transmitted. Alternatively, to set advance alert triggers 250, user 225 may provide a user input that causes processor 215 to generate a custom advance alert trigger. For a custom advance alert trigger, user 225 may input at least one of the particular appliance for which the remaining cycle time is to be determined, the alert trigger time 260, and the device to which the operating cycle alert should be transmitted.

As described above, when processor 215, executing the computer-readable instructions, determines that a remaining cycle time of an appliance 114, 154, and/or 156 is equal to an alert trigger time 260 specified in an advance alert trigger 250, the processor 215 generates and transmits an operating cycle alert to the device specified in the advance alert trigger 250. The operating cycle alert may include any audio and/or visual indication that notifies user 225 of the remaining cycle time for appliance 114, 154, and/or 156. For example, for an advance alert sent to computing device 106 and/or remote device 112, the alert may include at least one of a sound generated by computing device 106 and/or remote device 112 and an icon, symbol, and/or message displayed on computing device 106 and/or remote device 112. In some embodiments, the operating cycle alert is transmitted as a text message and/or email.

In the exemplary embodiment, the comparison between the remaining cycle time and alert trigger time 260 is performed by processor 215 in HEM 200. Alternatively, at least one of appliances 114, 154, and/or 156 may compare the remaining cycle time to alert trigger time 260. For example, in some embodiments, HEM 200 may communicate alert trigger time 260 to appliance 114, 154, and/or 156. Using a processor, appliance 114, 154, and/or 156 compares the alert trigger time 260 to the remaining cycle time of the appliance 114, 154, and/or 156. When the remaining cycle time is equal to alert trigger time 260, appliance 114, 154, and/or 156 communicates with HEM 200 such that the pertinent operating cycle alert is generated and transmitted.

Using a plurality of advance alert triggers 250, user 225 can set up a wide variety of operating cycle alert schedules. For example, user 225 can set advance alert triggers 250 such that when ten minutes remain in an operating cycle of dishwasher 118, an email is sent to computing device 106, when five minutes remain in the operating cycle, an icon appears on a display screen of remote device 112, and when thirty seconds remain in the operating cycle, a text message is sent to remote device 112.

FIG. 4 is a flowchart of an exemplary method 300 for transmitting an operating cycle alert that may be used with an energy management system, such as energy management system 100 and/or energy management system 150 (shown in FIGS. 1 and 2). Referring to FIGS. 1, 2, 3 and 4, a processor, such as processor 215 (shown in FIG. 3), determines 302 a remaining cycle time for an operating cycle of the appliance, such as any of appliances 114, 154, and/or 156 (shown in FIGS. 1 and 2). The operating cycle could include, for example, a washing cycle, a cooking and/or heating cycle, or a drying cycle. The appliance is communicatively coupled to the energy management system.

The processor compares 304 the remaining cycle time to an alert trigger time that represents a time before the end of the operating cycle. The alert trigger time may be stored, for example, in a memory device, such as memory device 210. When the remaining cycle time is equal to the alert trigger time, the processor generates 306 the operating cycle alert. The generated operating cycle alert is then transmitted 308 to a remote device, such as remote device 112 (shown in FIG. 1).

The embodiments described herein transmit an operating cycle alert for an appliance connected to a home energy manager. The operating cycle alert notifies a user of the remaining time in an operating cycle of the appliance. More specifically, home energy manager determines a remaining cycle time for an appliance and compares the remaining cycle time with an alert trigger time. When the remaining cycle time is equal to the alert trigger time, the home energy manager generates and transmits the operating cycle alert. Upon receiving the operating cycle alert, a user is notified of the remaining time for the operating cycle, and can plan accordingly.

Exemplary embodiments of transmitting an operating cycle alert for an appliance are described above in detail. The methods and systems are not limited to the specific embodiments described herein, but rather, components of the systems and/or steps of the methods may be utilized independently and separately from other components and/or steps described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus, comprising:
   a memory device configured to store computer-readable instructions and data representative of at least an alert trigger time that represents a time before an end of an operating cycle of an appliance communicatively coupled to a home energy manager; and
   a processor coupled to said memory device and configured to execute the computer-readable instructions, which when executed by said processor, cause said processor to:
   determine a remaining cycle time for the operating cycle of the appliance;
   compare the remaining cycle time to the alert trigger time stored in said memory device;
   generate an alert when the remaining cycle time is equal to the alert trigger time;
   transmit the generated alert to at least one remote device; and
   receive data comprising a user input that sets an advance alert trigger, the advance alert trigger identifying the appliance, the alert trigger time, and the at least one remote device.

2. The apparatus of claim 1, wherein to receive the user input that sets an advance alert trigger, the computer-readable instructions cause said processor to:
   receive a user input that selects at least one of a plurality of preset advance alert triggers; and
   store the selected advance alert trigger in said memory device.

3. The apparatus of claim 1, wherein to receive the user input that sets an advance alert trigger, the computer-readable instructions cause said processor to:
   receive a user input that creates a custom advance alert trigger; and store the custom advance alert trigger in said memory device.

4. The apparatus of claim 1, further comprising a user interface coupled to said processor, wherein to receive the user input that sets an advance alert trigger, the computer-readable instructions cause said processor to receive the user input from said user input interface.

5. The apparatus of claim 1, wherein to receive the user input that sets an advance alert trigger, the computer-readable instructions cause said processor to receive the user input from the at least one remote device.

6. The apparatus of claim 1, wherein to transmit the generated alert, the computer-readable instructions cause said processor to transmit the generated alert as at least one of an email and a text message.

7. One or more non-transitory computer-readable storage media having computer-readable instructions embodied thereon, wherein when executed by a processor, the computer-readable instructions cause the processor to:
   determine a remaining cycle time for an operating cycle of an appliance communicatively coupled to a home energy manager;
   compare the remaining cycle time to an alert trigger time that represents a time before the end of the operating cycle;
   generate an alert when the remaining cycle time is equal to the alert trigger time;
   transmit the generated alert to at least one remote device; and
   receive a user input that sets an advance alert trigger, the advance alert trigger identifying the appliance, the alert trigger time, and the at least one remote device.

8. The non-transitory computer-readable storage media of claim 7, wherein to receive the user input that sets an advance alert trigger, the computer-readable instructions cause the processor to receive a user input that selects at least one of a plurality of preset advance alert triggers.

9. The non-transitory computer-readable storage media of claim 7, wherein to receive the user input that sets an advance alert trigger, the computer-readable instructions cause the processor to receive a user input that creates a custom advance alert trigger.

10. The non-transitory computer-readable storage media of claim 7, wherein to receive the user input that sets an advance alert trigger, the computer-readable instructions cause the processor to receive the user input from a user interface of the home energy manager.

11. The non-transitory computer-readable storage media of claim 7, wherein to receive the user input that sets an advance alert trigger, the computer-readable instructions cause the processor to receive the user input from the at least one remote device.

12. The non-transitory computer-readable storage media of claim 7, wherein to transmit the alert, the computer-readable instructions cause the processor to transmit the generated alert as at least one of an email and a text message.

13. A method for transmitting an operating cycle alert for an appliance communicatively coupled to a home energy manager, said method comprising:
   determining, using a processor, a remaining cycle time for an operating cycle of the appliance;
   comparing, using the processor, the remaining cycle time to an alert trigger time that represents a time before the end of the operating cycle;
   generating, using the processor, the operating cycle alert when the remaining cycle time is equal to the alert trigger time;
   transmitting the generated operating cycle alert to at least one remote device; and
   receiving a user input that sets an advance alert trigger, the advance alert trigger identifying the appliance, the alert trigger time, and the at least one remote device.

14. The method of claim 13, wherein receiving a user input that sets an advance alert trigger comprises receiving a user input that selects at least one of a plurality of preset advance alert triggers.

15. The method of claim 13, further comprising:
   transmitting the alert trigger time to the appliance, and
   wherein comparing the remaining cycle time to an alert trigger time comprises comparing the remaining cycle time to the alert trigger time at the appliance.

16. The method of claim 13, wherein receiving a user input that sets an advance alert trigger comprises receiving the user input from at least one of the at least one remote device and a user interface of the home energy manager.

17. The method of claim 13, wherein transmitting the generated operating cycle alert comprises transmitting the generated operating cycle alert as at least one of an email and a text message.

\* \* \* \* \*